June 4, 1968   O. E. LARSEN   3,387,073
POLYETHYLENE EXTRUSION
Filed Jan. 10, 1964
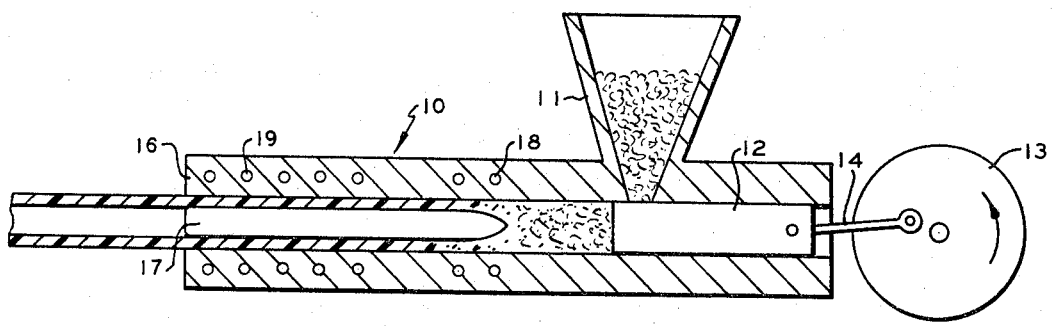
INVENTOR.
O. E. LARSEN
BY
ATTORNEYS

United States Patent Office 3,387,073
Patented June 4, 1968

3,387,073
POLYETHYLENE EXTRUSION
Olaf E. Larsen, Bartlesville, Okla., assignor to Phillips Petroleum Company, a corporation of Delaware
Filed Jan. 10, 1964, Ser. No. 337,003
4 Claims. (Cl. 264—211)

ABSTRACT OF THE DISCLOSURE

Glycerol is used as a processability additive in the extrusion of thermoplastic polymers by dynamic extrusion.

---

This invention relates to the extrusion of thermoplastics. In one aspect it relates to a process for thermoplastic extrusion utilizing a processability additive. In another aspect it relates to thermoplastic extrusion compositions. In another aspect it relates to a process for making thermoplastic extrusion compositions.

Polymers of olefins have properties which make them highly desirable for use in extruding articles, for example pipe. An especially suitable olefin polymer for extruding articles is produced by polymerization of an olefin, or copolymerization of a mixture comprising two olefins, with a chromium oxide polymerization catalyst at a temperature such that substantially all of the polymer is insoluble in the hydrocarbon. Such a polyolefin, which is sometimes called "particle form polymer," has greatly increased resistance to stress cracking, increased stress life, and increased resistance to cyclic stress, all of these effects being especially noticeable at high temperature. However these polymers have a relatively low melt index, generally below about 0.2 as measured by ASTM-D-1238-57T, Condition E, and for this reason are difficult to process in conventional thermoplastic apparatus. The melt index of such polymers is measured by a high load melt index, ASTM-D-1238-57T, Condition F, and ranges usually from about 0.5 to 4.5. Particle form polymer is too viscous to flow through the orifice of the test apparatus at Condition E of the ASTM Method.

Attempts to use conventional apparatus to extrude such polymer results in reduced throughput rate and uneven surfaces and cross sections. The low melt index thermoplastic polymers can be extruded by using a long land die extruder utilizing repeated pressure impulses, an extruder of the type disclosed in Ser. No. 157,992, Olaf E. Larsen, filed Dec. 8, 1961, now U.S. Patent No. 3,239,881, a process which is referred to in this application as "dynamic extrusion."

As explained in my above-noted earlier filed application, a long land die is one having a long cross section of the desired configuration whereby the extrudate is initially formed, maintained in the desired shape, cooled and solidified without interruption of the die passage and without an abrupt temperature discontinuity. Means are provided to heat the material and plasticize it prior to forcing it into the die and the inlet of the die is maintained above the melting point of the resin. The resin is permitted to cool sufficiently to become solidified prior to leaving the die. Use of such a die makes possible the extrusion of articles, for example pipe, of particle form polyethylene, which articles have extremely smooth, even, glossy surfaces and extremely accurate cross section control. Although the temperature gradient decreases smoothly through the die, it is not essential that the gradient be at exactly the same slope throughout the die. That is, cooling means can be provided only at the outlet end of the die, relying on the metal body of the die to maintain a constant temperature gradient throughout the die, or cooling means can be provided through a substantial portion of the die length. In the latter instance, although the temperature gradient may vary, there is no temperature discontinuity or abrupt change such as occurs when insulation is provided between the forming die, for example an air gap, an insert of insulation material, etc.

An object of this invention is to extrude thermoplastic materials. Another object of this invention is to improve the extrusion of thermoplastic materials by using a processability additive. Another object of this invention is to provide thermoplastic extrusion compositions.

Other aspects, objects and the advantages of my invention are apparent in the written description, the drawing and the claims.

Through the practice of the present invention, the extrusion of thermoplastic polymers by dynamic extrusion is facilitated by using glycerol as a processability additive. The invention is particularly suitable for extruding particle form polymers and more especially is suited for extruding particle form polyethylene polymers. In this application and claims, unless otherwise noted, the expression "polyethylene polymers" includes polyethylene homopolymers, copolymers of polyethylene and another polymerizable monomer, and mixtures of polyethylene homopolymers or copolymers with another polymer or copolymer of ethylene or another resin. However, the invention also is suitable for use with other relatively low melt index polymers. For example, high density, low melt index polymers are made by contacting an olefin such as ethylene, propylene, 1-butene, and the like, with a two or more component catalyst wherein one component is an organometal compound, including those where one or more but not all organo groups is replaced by a halogen; a metal hydride; or a metal of Group I, II or III; and the second component is a Group IV to VI metal compound, e.g., salt or alcoholate. A third catalyst component which can be used advantageously is an organic halide or metal halide where the organic radical has 30 or fewer carbon atoms and is advantageously an alkyl, cycloalkyl or aryl group. Such catalysts are more fully discussed in the patent of Reynolds et al., U.S. 2,886,561, May 12, 1959. The invention also is applicable to other resins, particularly those having a relatively low melt index and being difficultly extrudable.

The amount of glycerol used in the practice of this invention preferably is in the range of ¼ to 3 percent by weight of the extrusion composition. The glycerol is incorporated either by dry blending, that is by mixing the glycerol with particulate extrusion composition, as by tumbling, for example, or by precompounding, by extrusion compounding, in a Banbury type mixer, or a Farrell continuous mixer, etc. When dry blending, preferably a diluent is used, preferably one selected from the group consisting of methyl alcohol, ethyl alcohol, isopropyl alcohol and tertiary butyl alcohol. A diluent is not needed when the composition is precompounded.

Therefore, according to this invention, extrusion compositions for dynamic extrusion have glycerol incorporated therein prior to extrusion. Further according to the invention thermoplastic compositions are prepared for extrusion by incorporating glycerol therein. Further, according to the invention, a diluent is used when incorporating glycerol into a thermoplastic extrusion composition by dry blending, preferably a diluent selected from the group consisting of methyl alcohol, ethyl alcohol, isopropyl alcohol, and tertiary butyl alcohol. Further according to the invention there is provided an extrusion composition comprising a thermoplastic having glycerol incorporated therein. Further according to the invention thermoplastic compositions are extruded by incorporating glycerol therein, and forcing the composition through a long land die by repeated pressure impulses.

In the drawing, an extrusion apparatus, suitable for the practice of polymer extrusion according to the invention is illustrated schematically. The apparatus comprises a long land die 10, a feed hopper 11, a reciprocating impulse piston 12, and a fly wheel 13, connected to piston 12 by a connecting rod 14.

Die 10, as illustrated, is constructed for the extrusion of pipe, and therefor comprises an outer bushing 16 and an inner mandrel 17. Bushing 16 has heating means 18 and cooling means 19 incorporated therein.

In operation, the extrusion composition, in particulate form and having glycerol incorporated therein, is placed in hopper 11. The fly wheel 13 is rotated by suitable drive means such as an electric motor, not shown, causing piston 12 to reciprocate in the extrusion apparatus. On the back stroke, piston 12 uncovers the open lower end of hopper 11, permitting a metered quantity of the extrusion composition to flow into the extrusion channel. On the forward stroke, piston 12 forces the entire mass of extrusion composition forward, thus extruding a portion of pipe from die 10. The composition is particulate as it leaves the position immediately beneath hopper 11 and gradually is softened as it comes under the influence of heating means 18 and extrusion pressure. The composition, while softened, is formed in the entrance portion of die 10 to the desired cross sectional shape, and is retained in this shape as it progresses through the die 10 and comes under the influence of cooling means 19. The composition is cooled below its softening point and emerges from the outer end of die 11 in solidified form.

EXAMPLE I

A polyethylene extrusion composition was precompounded comprising: 90 parts by weight of a particle form ethylene, 1-butene copolymer having a density of about 0.940 and a high load melt index (ASTM–D–1238–57T, Condition F) of about 2.

10 parts of a concentrate comprising: 75 parts by weight of a polyethylene solution polymer having a density of about 0.95 and a melt index of about 0.3 (ASTM–D–1238–57T, Condition E); 25 parts of Philblack A, a commercial carbon black; 0.1 percent by weight Santonox, 4,4'-thiobis(6-tert-butyl-m-cresol); .2 percent dilauryl thiodipropionate; 1 percent by weight glycerol.

This composition was extruded through a long land die in the shape of a 1½ inch schedule 40 pipe, with extrusion impulses supplied by a 25-ton punch press modified to hold the die and operate the extrusion piston. The pipe was extruded at the rate of 22½ inches per minute and, when tested, showed a ductile burst with no voids in the pipe. The ductile burst refers to a type of failure which is obtained in a quick burst test. For the quick burst test the apparatus and procedure of ASTM 1599–58T are used. The type of failure is an indication of the homogeneity and uniformity of the resin and the quality of the pipe. Experience has shown that if the pipe failure is "ductile" on the quick burst test and no visible defects exist in the pipe it also does well on long term tests such as ASTM–D–1598–58T. If the pipe failure is a "rip type burst" experience has shown that on long term tests the pipe does poorly even if it has no visible, obvious defects. However, often voids are visible when this type of burst occurs.

This example illustrates the extrudability of a precompounded extrusion composition within the scope of my invention.

EXAMPLE II

A particle form polyethylene polymer, having a density of 0.942 and a melt index of 0.72, as measured by ASTM–D–1238–57T, Condition F, was dry blended by tumbling with ¾ percent by weight of glycerol without diluent, and was extruded with the same machine and in the same manner as the extrusion of Example I. The extrusion rate was 13 inches per minute, and a test of the pipe showed no noticeable voids but the pipe, when tested, showed rip bursts.

This example shows some reduction in the quality of the pipe used and in the extrusion rate, apparently due to mixing difficulty in dry blending the glycerol with the particular polymer.

EXAMPLE III

A quantity of the particle form polymer of Example II was dry blended by tumbling with a solution of ¾ percent by weight glycerol and ½ percent by weight isopropyl alcohol. The resulting composition was extruded with the same machine and in the same manner as that of Example I, and consecutive tests resulted in extrusion rates of 23 and 28 inches per minute. In both instances the pipe had no voids and produced ductile bursts.

This example illustrates the operability of my invention using dry blending with a solution of glycerol in alcohol.

EXAMPLE IV

A quantity of the particle form polymer of Example II was blended by tumbling in the same manner as the blending of Example III but with ¾ percent water and ½ percent isopropyl alcohol. The extrusion rates in two consecutive tests were 21 inches per minute and 30 inches per minute. However, the pipe when examined showed numerous small voids and produced rip type bursts in both instances. This example indicates that a substitution of water for glycerol reduces the quality of the pipe produced.

EXAMPLE V

A quantity of the particle form polymer of Example II was blended by the method of Example III but with ¾ percent by weight of water. In two consecutive tests the extrusion rates were 22 inches per minute and 13 inches per minute. In both instances the pipe showed numerous voids and resulted in rip type bursts.

This example illustrates that the use of water alone as a processability addition results in low quality product.

EXAMPLE VI

The composition of Example I was tested in a die producing a 1-inch schedule 40 pipe attached to a 12-ton extruder which was a modification of a 12-ton punch press. The pipe was extruded at the maximum plasticizing rate of this extruder, that is 9 inches per minute, and showed no voids, thus again illustrating the operability of a precompounded extrusion compound with glycerol.

EXAMPLE VII

A blend of the particle form polymer of Example II with .2 percent by weight of zinc stearate was tested in the machine and in the same manner as that in connection with Example VI. The product produced was not suitable for testing.

EXAMPLE VIII

A quantity of the particle form polymer of Example II was extruded in the machine in the same manner as described in connection with Example VI, with no processability additive. The product was unsuitable for testing.

In this application, "pre-compounding" is used to define a method of incorporating an additive into the thermoplastic by working to the degree that the thermoplastic is plasticized. By "dry-blending" is meant a method of incorporating an additive without appreciable softening of the polymer, by mixing with discrete particles of the polymer. When pre-compounding, no diluent for the glycerol is needed. When using ordinary mixing, such as tumbling, it is preferred that the amount of diluent should be 50 to 100 percent by weight of the glycerol, that is from a ratio of 1 part by weight of diluent to 2 parts by weight of glycerol, to equal parts of diluent and glycerol. Larger amounts of alcohol can be used but generally serve no useful purpose. Smaller amounts of diluent may suffice if more intensive methods of dry-blending are used.

Reasonable variation and modification are possible within the scope of my invention which sets forth extrusion compositions, a process for making extrusion compositions and a process for extruding low melt index thermoplastic materials.

I claim:

1. A process for forming an elongated article, comprising the steps of:
   incorporating into a thermoplastic composition an amount of glycerol in the range of ¼ to 3 percent by weight of said composition;
   forcing a plastic melt of said composition containing said glycerol through a long land extrusion zone by applying pressure impulses to said melt; and
   maintaining a smoothly decreasing temperature gradient along said zone to solidify said melt prior to removal from said zone.

2. The process of claim 1, wherein said thermoplastic composition comprises a particle form polyethylene polymer.

3. An extrusion process, comprising the steps of:
   forcing through a long land extrusion zone by applying pressure impulses thereto, a melt of a thermoplastic composition having incorporated therewith an amount of glycerol in the range of ¼ to 3 percent by weight of said composition; and
   maintaining a smoothly decreasing temperature gradient along said zone to solidify said melt prior to removal from said zone.

4. The process of claim 3, wherein said thermoplastic composition comprises a particle form polyethylene polymer.

References Cited

UNITED STATES PATENTS

| | | | |
|---|---|---|---|
| 2,980,964 | 4/1961 | Dilke | 260—33.4 |
| 3,083,410 | 4/1963 | McGlamery | 264—294 |
| 3,206,419 | 9/1965 | Pritchard et al. | 260—33.4 |

FOREIGN PATENTS

| | | |
|---|---|---|
| 889,478 | 2/1962 | Great Britain. |

OTHER REFERENCES

Doolittle, A.K.: The Technology of Solvents and Plasticizers, N.Y., John Wiley and Sons, Inc., 1954, p. 172–3.

Plastics Engineering Handbook, N.Y., John B. Watkins Co., 1954, p. 255, 272–3 and 332.

Renfrew, A. et al.: Polyethene, N.Y., Interscience Publishers Inc., 1960, p. 410 and 513–15.

ROBERT F. WHITE, *Primary Examiner.*

C. AUVILLE, *Assistant Examiner.*